(12) United States Patent
Pok et al.

(10) Patent No.: US 8,730,824 B2
(45) Date of Patent: May 20, 2014

(54) METHOD AND APPARATUS FOR MANAGING SERVICES IN A COMMUNICATION SYSTEM

(75) Inventors: Chou Lan Pok, San Ramon, CA (US); James Fan, San Ramon, CA (US); Michael Raftelis, San Antonio, TX (US); Kevin Meng, San Ramon, CA (US); Raghvendra G. Savoor, Walnut Creek, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 861 days.

(21) Appl. No.: 11/462,853

(22) Filed: Aug. 7, 2006

(65) Prior Publication Data

US 2008/0031135 A1 Feb. 7, 2008

(51) Int. Cl.
*H04L 12/24* (2006.01)

(52) U.S. Cl.
CPC ......... *H04L 41/5048* (2013.01); *H04L 41/5045* (2013.01)
USPC ........................................................ 370/252

(58) Field of Classification Search
CPC ........................ H04L 41/5045; H04L 41/5048
USPC ................... 370/352, 395.1, 395.4; 379/1.04, 379/201.01; 705/35; 709/224, 233
See application file for complete search history.

(56) References Cited

U.S. PATENT DOCUMENTS

| | | | | |
|---|---|---|---|---|
| 5,867,494 A | * | 2/1999 | Krishnaswamy et al. | .... 370/352 |
| 5,913,041 A | * | 6/1999 | Ramanathan et al. | ........ 709/233 |
| 6,292,539 B1 | * | 9/2001 | Eichen et al. | ................. 379/1.04 |
| 6,397,193 B1 | * | 5/2002 | Walker et al. | .................... 705/16 |
| 6,427,132 B1 | * | 7/2002 | Bowman-Amuah | ............ 703/22 |
| 6,856,676 B1 | * | 2/2005 | Pirot et al. | ............... 379/201.01 |
| 7,391,780 B1 | * | 6/2008 | Stone et al. | ............. 370/395.41 |
| 2002/0101881 A1 | | 8/2002 | Sundaresan et al. | |
| 2002/0120540 A1 | * | 8/2002 | Kende et al. | .................... 705/35 |
| 2003/0156685 A1 | * | 8/2003 | Erving et al. | .............. 379/27.01 |
| 2003/0165226 A1 | * | 9/2003 | Vu et al. | .................... 379/221.01 |
| 2006/0159106 A1 | * | 7/2006 | Slyke et al. | ............. 370/395.21 |
| 2007/0078970 A1 | * | 4/2007 | Zabihi et al. | .................. 709/224 |
| 2007/0081523 A1 | * | 4/2007 | Mishra | .......................... 370/352 |

OTHER PUBLICATIONS

Verizon, Verizon Website captured form the web archive (a.k.a. the Wayback Machine), Jan. 8, 2006.*

* cited by examiner

*Primary Examiner* — Joseph Bednash
(74) *Attorney, Agent, or Firm* — Guntin & Gust, PLC; Jay H. Anderson

(57) ABSTRACT

A method and apparatus for managing services in a communication system is disclosed. An apparatus that incorporates teachings of the present disclosure may include, for example, a system having a collection element that receives a plurality of service component definitions associated with a corresponding plurality of services of a communication system, a service bundle generation element that generates a plurality of service bundles from the plurality of service component definitions, a policy element that determines a network configuration for each of the plurality of service bundles, a loop rate determination element that determines a data rate for a communication loop coupled to the communication system, and a service offering element that presents one or more service bundles selected from the plurality of service bundles according to the data rate. Additional embodiments are disclosed.

17 Claims, 3 Drawing Sheets

METHOD AND APPARATUS FOR MANAGING SERVICES IN A COMMUNICATION SYSTEM

RELATED APPLICATION

U.S. patent application Ser. No. 11/462,864, filed Aug. 7, 2006, by Pok et al., entitled "Method and Apparatus for Generating Configuration Information for a Communication System," now U.S. Patent Application Publication No. US 2008/0043719 published Feb. 21, 2008, incorporated herein by reference in its entirety.

FIELD OF THE DISCLOSURE

The present disclosure relates generally to communication systems, and more specifically to a method and apparatus for managing services in a communication system.

BACKGROUND

Providers of communication services today manually enter service bundle definitions and associated network configuration information for enabling service bundles in a communication system. As high bandwidth infrastructure such as fiber to the curb, node, or home (FTTC, FTTN, or FTTH) continues to be deployed, the number of service bundles possible grows rapidly. Consequently, entering a large volume of service bundle definitions and corresponding network configuration manually can be error prone and inefficient.

In addition, many service providers today assume that prospective customers have a fixed data rate at their home or establishment. As a result, there is less variety of services offered to consumers who might otherwise have the resources for more services. This fixed bandwidth approach can result in lost revenue for the service provider.

A need therefore arises for a method and apparatus for managing services in a communication system.

DETAILED DESCRIPTION

Embodiments in accordance with the present disclosure provide a method and apparatus for managing services in a communication system.

In a first embodiment of the present disclosure, a system can have a collection element that receives a plurality of service component definitions associated with a corresponding plurality of services of a communication system, a service bundle generation element that generates a plurality of service bundles from the plurality of service component definitions, a policy element that determines a network configuration for each of the plurality of service bundles, a loop rate determination element that determines a data rate for a communication loop coupled to the communication system, and a service offering element that presents one or more service bundles selected from the plurality of service bundles according to the data rate.

In a second embodiment of the present disclosure, a computer-readable storage medium can have computer instructions for presenting one or more service bundles selected from a plurality of service bundles according to a data rate determined for a communication loop coupled to a communication system, wherein each of a plurality of service bundles has a network configuration associated therewith which is determined from a plurality of service component definitions associated with a corresponding plurality of services of the communication system In a third embodiment of the present disclosure, a method can have the step of presenting one or more service bundles selected from a plurality of service bundles according to a constraint associated with at least one among a communication loop and a communication system coupled thereto, wherein each of a plurality of service bundles has a network configuration associated therewith which is determined from a plurality of service component definitions associated with a corresponding plurality of services of the communication system.

Figure 1:
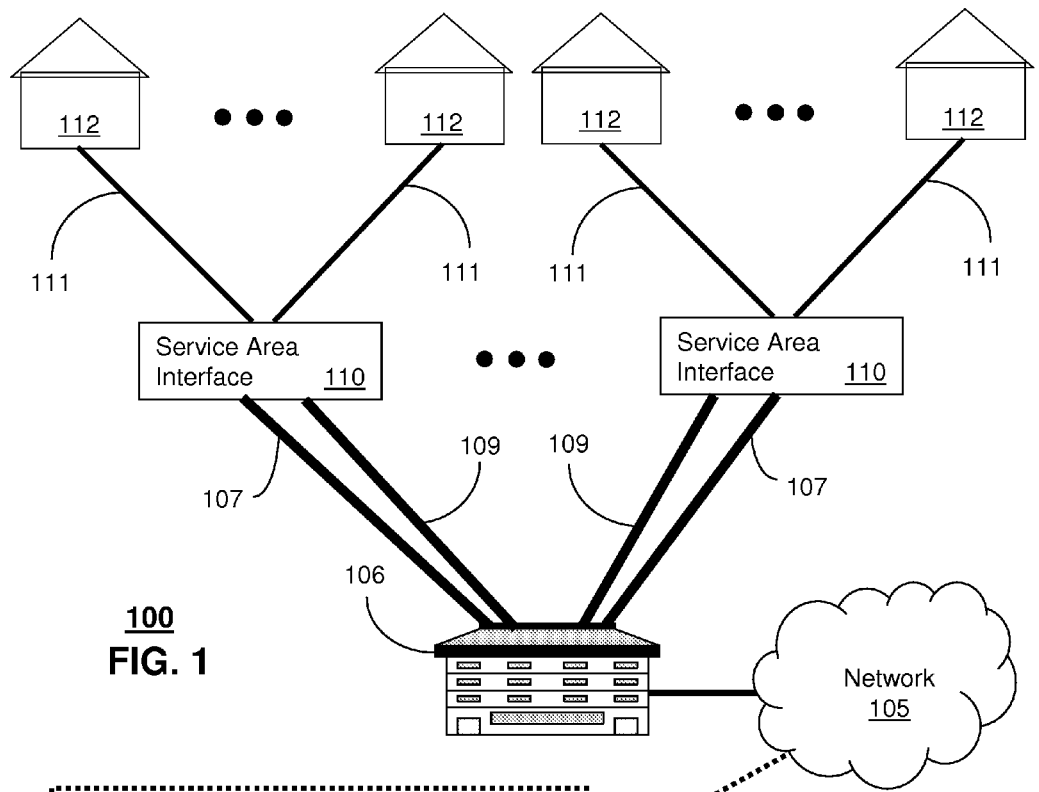
FIG. 1 depicts an exemplary block diagram of a communication system.

FIG. 1 depicts an exemplary block diagram of a communication system 100. The communication system 100 comprises a central office (CO) 106 and a plurality of service area interfaces (SAIs) 110 each coupled to a plurality of buildings 112. The CO 106 houses common network switching equipment for distributing local and long-distance telecommunication services supplied by network 105 to buildings 112 (such as single family or multi-family dwellings or commercial enterprises) by way of the SAI 110. For illustration purposes only, buildings 112 will be referred to herein as residences 112. Telecommunication services of the CO 106 can include traditional circuit-switched services such as POTS (Plain Old Telephone Service) and/or packet-switched services such as HDTV, VoIP (Voice over Internet Protocol), IPTV (Internet Protocol Television), and Internet data supplied to a residence 112 by way of for example very high bit rate DSL (VDSL) technology operating over legacy twisted pair cable lines 111.

Links 107 can be twisted copper pairs for distributing power to the SAIs 110. The SAI 110 can be coupled to optical and/or electrical cables 109 supplied by the CO 106, which carries any one or more of the aforementioned communications services. These services can be processed in part by active circuits in the SAI 106 and/or circuits at the residences 112. Each cable 109 carries communication lines numbering in the tens or hundreds. The SAI 110 serves to distribute portions of the communication cables 109 among the residences 112 as dedicated communication links 111. Thus, the SAI 110 serves as a local cross-connect system for unbundling communication lines in cable 109.

Figure 2:
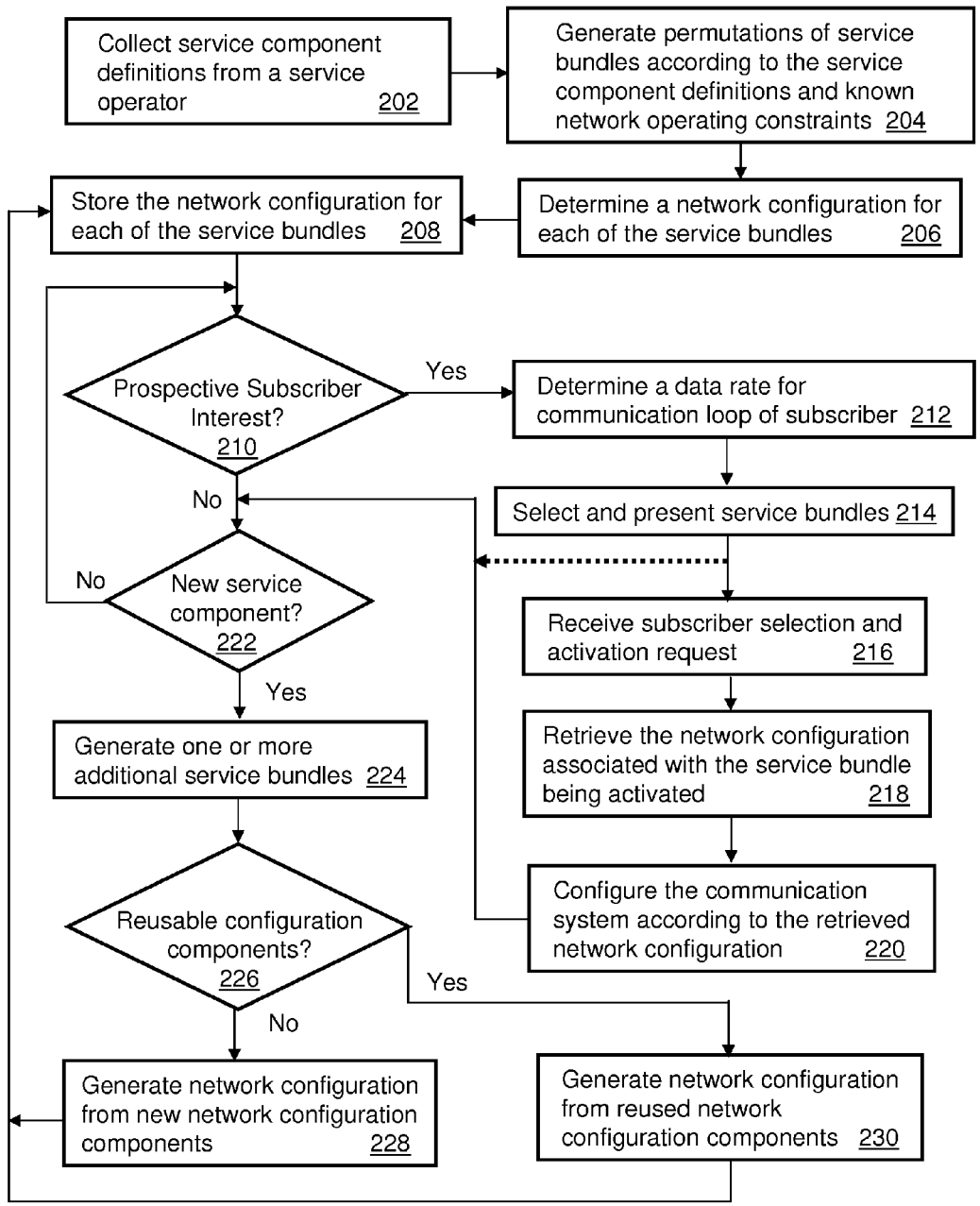
FIG. 2 depicts an exemplary method operating in the communication system.

The communication system 100 can further include a system 120. The system 120 can be utilized for establishing and activating service bundles according to associated network configurations and constraints of the communication system 100. To accomplish these tasks, the system 120 can comprise a collection element 122, a service bundle generation element 124, a policy element 126, a storage element 128, a loop rate determination element 130, a service offering element 132, and an application element 134. Elements 122-134 can be implemented in software and/or hardware and can operate independently in remote locations from each other, or collectively as a single system at one location. FIG. 2 depicts an exemplary method 200 operating in the system 120 and other portions of the communication system 100.

Method 200 begins with step 202 in which the collection element 122 receives a number of service component definitions associated with services of the communication system 100. For example, a service component definition can define business rules for operating a Voice over IP (VoIP) service in the communication system 100. The business rules can establish that a VoIP service is to have priority over other IP traffic. Other service component definitions can represent variants of IPTV service such as standard-definition television (SDTV) and high-definition television (HDTV). Service component definitions can also be used for defining various forms of Internet service (low, mid and high-speed) as well as portal services (retail, auctioning, travel, etc.). Generally speaking, there are limitless service component definitions that can be supplied by the operator of the communication system 100 to the collection element 122 of the system 120.

Once the service components definitions have been collected, the system 120 can proceed to step 204 where the service bundle generation element 124 generates all possible permutations of service bundles that can be derived from the total set of service component definitions supplied by the service provider in step 202 according to known network operating constraints of the communication system 100. A network operating constraint can represent any known limitation of the communication system 100 such as, for example, the bandwidth capacity or network topology of the communication system 100.

Once the service bundles have been generated, the system 120 proceeds to step 206 where the policy element 126 determines a network configuration for each of the service bundles. The network configuration can be represented by a number of network configuration components such as a Quality of Service (QOS) policy, a security policy, a queuing policy, and a portal redirect policy—just to name a few. These policies can be predefined by the service operator according to the network operating constraints of the communication system 100. For example, depending on network capacity, network topology, and network design (e.g., a multi-protocol label switching network versus an asynchronous transfer mode network, or combinations thereof), the aforementioned policies can be preconfigured according to objectives established by the service provider such as managing profitability, cost, quality, performance, and security in the communication system 100.

After a network configuration is determined for each of the service bundles in step 206, the storage element 128 is called on in step 208 to store the network configuration for each service bundle according to an identifier established for each service bundle for ease of retrieval. With the service bundles and corresponding network configurations identified, the system 120 proceeds to step 210 where it checks for interest from a prospective subscriber. This step can represent a prospective subscriber calling a sales agent associated with the service provider of communication system 100, or browsing a website or communicating with an interactive voice response (IVR) system directed by system 120 or an integral part thereof. In step 210, the prospective subscriber can be asked by the sales agent or the website or IVR to identify him or herself by location, phone number and/or name.

With the information supplied by the prospective subscriber, the system 120 proceeds to step 212 where it determines a data rate for a communication loop 111 determined to be associated with the prospective subscriber. The communication loop 111 can be an integral part of the communication system 100 (such as by way of the SAIs 110) or can be accessed by inter-carrier relationships. The data rate of the prospective subscriber's communication loop 111 can be determined by any number of methods such as for example analyzing one or more electro-mechanical characteristics of the communication loop (e.g., loop length, loop bridge taps, etc.), gathering information for an active communication loop located near to the communication loop (e.g., a next-door neighbor's loop rate), or monitoring communication activity on the communication loop of the prospective subscriber from existing or previous services subscribed thereby.

Once the data rate of the communication loop 111 has been determined, the system 120 proceeds to step 214 where it presents one or more service bundles selected from the total set of service bundles generated in step 204 according to the data rate and one or more business objectives set forth by the service provider of the communication system 100. Depending on the subscriber's data rate a number of the service bundles generated in step 204 may need to be ignored by system 120. For example, suppose that a data rate of 60 Mbps (e.g., the highest rate possible in the communication system 100) results in the generation of 1000 service bundles in step 204. For a subscriber with half the data rate (e.g., 30 Mbps), the service offering element 132 can determine in step 214 that less than half of the service bundles available can be offered to the prospective subscriber.

Business objectives set by the service provider can serve as an additional constraint in determining which service bundles are offered to the prospective subscriber. For example, the selection of service bundles can be further limited if it is determined based on the data rate of the prospective subscriber's loop that a modification is needed in the communication system 100 to support this rate or a modification is required to increase the rate. The modification can include the installation of a non-existing xDSL line, or the need for repair service to increase the speed of an existing xDSL line to a desired rate. In either case, the service provider can decide to offer no service at all, or offer the prospective subscriber higher than normal subscription pricing to recover the investment in installation and/or repair of the subscriber's communication loop 111.

Suppose instead the prospective subscriber's communication loop 111 has a data rate within a desired range for offering one or more service bundles from the total set derived in step 204. In this instance, the service provider can establish rules in the service offering element 132 so that the service selection process is determined from a number of factors including without limitation a return on investment objective, the prospective subscriber's service preferences, State and/or Federal regulations affecting services in the location of the prospective subscriber, demographic and/or psychographic information associated with the prospective subscriber, and/or promotional, discount or pricing models being applied in the location of the prospective subscriber. It would be evident to an artisan with ordinary skill in the art that any number of business objectives can be used to select service bundles from the total permutations set forth in step 204. Business objectives can also be used to determine any number of pricing arrangements which can be presented to the sales agent, or prospective subscriber by way of a website or IVR.

With this flexibility, system 120 can closely target the needs of the prospective subscriber within the bounds of the aforementioned constraints of the communication system 100. If the prospective subscriber selects one of the presented service bundles, the system 120 proceeds to step 216; otherwise, the system 120 proceeds to step 222 as will be described shortly. Assuming that the former occurs, system 120 invokes the application element 134 to retrieve in step 218 a network configuration associated with the selected service bundle according to its corresponding identification. In step 220, the application element 134 configures the communication system 100 according to the retrieved configuration. This step can represent a process for configuring for example a residential gateway residing in the prospective subscriber's residence 112 and any number of intermediate network elements operating in the communication system 100 such as a digital subscriber line access multiplexer (DSLAM) for configuring a VDSL interface to the residence, a service switching point (SSP), IPTV, an IP multimedia subsystem (IMS), routers in network 105, and so on.

From step 210, 214 or 220 system 120 proceeds to step 222 where it invokes the collection element 122 to check for new service component definitions supplied by the service operator. If none have been supplied, the system 120 returns to step 210 to check for additional prospective subscribers. If, on the other hand, one or more new service component definitions have been supplied by the service operator, the system 120 proceeds to step 224 where the service bundle generation element 124 generates one or more additional service bundles according to the new service component definition(s) supplied by the service operator. Each service component definition can represent a new communication service not previously supported by the communication system 100, or a variant of an existing service. For example, a previous instance of Internet services may have provided two bandwidth options. As a result of improvements made to the communication system 100, the service operator may now be able to provide three or more bandwidth options leading up to the new service component definitions supplied in step 222.

In step 226, the policy element 126 checks whether there are reusable network configuration components for the new service bundles generated in step 224. If no reusable components are found, the policy element 126 proceeds to step 228 where it generates a new network configuration; otherwise, the policy element 126 proceeds to step 230 where it generates the network configuration for each of the additional service bundles from reused network configuration components. In cases where some but not all network configuration components can be reused, the policy element 126 can generate a network configuration according to a combination of steps 228-230. That is, for each new service bundle the policy element 126 can reuse some network configuration components and create others or request that the service provider provide new network configuration components to support these new services. Once the new service bundles and corresponding network configurations have been generated, the system 120 proceeds to step 208 where the storage element 128 stores said bundles and configurations as noted earlier for future use in steps 210-220.

Figure 3:
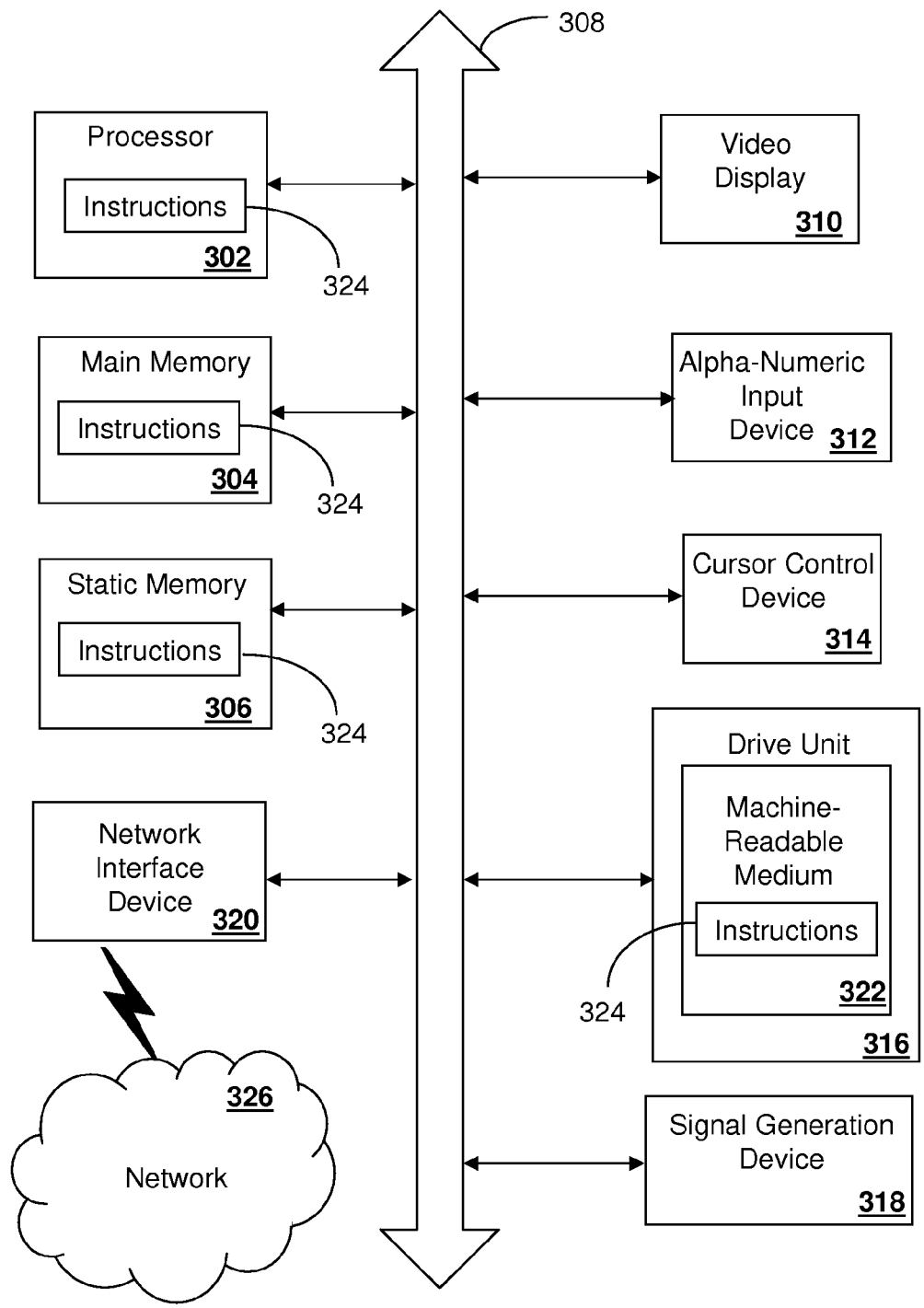
FIG. 3 is a diagrammatic representation of a machine in the form of a computer system within which a set of instructions, when executed, may cause the machine to perform any one or more of the methodologies discussed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable medium encoded with software instructions which, when executed by a processor, cause the processor to perform operations comprising:
   receiving a plurality of service component definitions associated with a corresponding plurality of services of a service provider operating a communication system, the service components consisting of communication services provided directly to consumers of the communication services, the consumers being subscribers to the communication system;
   generating a plurality of service bundles, wherein each service bundle of the plurality of service bundles comprises a respective different grouping of the plurality of service component definitions and wherein the plurality of service bundles comprises all possible permutations derivable from the plurality of service component definitions subject to network operating constraints of the communication system but not subject to subscriber criteria;
   determining a respective network configuration for each of the plurality of service bundles;
   receiving identification data of a prospective subscriber, wherein the prospective subscriber initiates contact between the prospective subscriber and the service provider;
   identifying from the identification data a communication loop coupled to the communication system having an association with the prospective subscriber;
   determining a data rate of the communication loop;
   identifying a target service bundle from among the plurality of service bundles that requires an infrastructure modification in the communication system, not previously made by the service provider, based on the data rate of the communication loop;
   determining, in accordance with business objectives of the service provider, whether to offer the target service bundle to the prospective subscriber;
   initiating, responsive to determining that the target service bundle is to be offered to the prospective subscriber, a repair of the communication loop or an installation of another communication loop, in accordance with the infrastructure modification identified as required by the target service bundle;
   adjusting, responsive to determining that the target service bundle is to be offered to the prospective subscriber, a cost for the target service bundle to generate an adjusted cost, wherein the adjusting of the cost is based on a type of infrastructure modification required in the communication system, wherein the adjusted cost is higher than a normal subscription price, to recover an investment in the repair or the installation;
   presenting to the prospective subscriber a reduced set of service bundles selected from the plurality of service bundles, wherein the plurality of service bundles are reduced in number according to the data rate and according to demographic or psychographic information associated with the prospective subscriber or business objectives of the service provider, and wherein the reduced set of service bundles includes the target service bundle; and
   presenting to the prospective subscriber the adjusted cost for the target service bundle.

2. The non-transitory machine-readable medium of claim 1, wherein the operations further comprise determining the data rate according to communication activity monitored on the communication loop, wherein the plurality of service component definitions include definitions of business rules for operating a voice over internet protocol service, wherein the business rules govern internet protocol traffic priority.

3. The non-transitory machine-readable medium of claim 1, wherein the communication loop operates according to a very high bit-rate digital subscriber line service, and wherein the respective network configuration for each of the plurality of service bundles include a quality of service policy, a security policy, a queuing policy, or a portal redirect policy.

4. The non-transitory machine-readable medium of claim 1, wherein the identification data of the prospective subscriber is received in response to detecting a request for a service bundle from the prospective subscriber, and wherein the type of infrastructure modification includes an installation of an xDSL line or a repair of an xDSL line.

5. The non-transitory machine-readable medium of claim 1, wherein the operations further comprise selecting the reduced set of service bundles from the plurality of service bundles according to a return on investment objective, a preference of the prospective subscriber, state and federal regulations, a promotional model, a discount model, or a pricing model.

6. The non-transitory machine-readable medium of claim 1, wherein the operations further comprise:
storing the respective network configuration for each of the plurality of service bundles; and
receiving an activation request associated with a selected service bundle of the plurality of service bundles selected by the prospective subscriber from the reduced set of service bundles, retrieve the respective network configuration associated with the selected service bundle, and configure the communication system according to the respective network configuration associated with the selected service bundle.

7. A non-transitory machine-readable medium encoded with software instructions which when executed by a processor, cause the processor to perform operations comprising:
generating a plurality of service bundles, wherein each service bundle of the plurality of service bundles comprises a respective different grouping of a plurality of service component definitions, and wherein the plurality of service bundles comprises all possible permutations derivable from the plurality of service component definitions associated with a plurality of services of a service provider operating a communication system, the service components consisting of communication services provided directly to consumers of the communication services, the consumers being subscribers to the communication system, the permutations subject to network operating constraints of the communication system but not subject to subscriber criteria;
presenting to a prospective subscriber a reduced set of service bundles selected from the plurality of service bundles, wherein the plurality of service bundles are reduced in number according to a data rate determined for a communication loop associated with the prospective subscriber and according to a return on investment objective of the service provider;
adjusting a cost for a target service bundle of the reduced set of service bundles to generate an adjusted cost, in response to determining that the target service bundle requires an infrastructure modification in the communication system, not previously made by the service provider, that includes installation of a communication line and repair of a communication line, wherein the adjusted cost is higher than a normal subscription price, to recover an investment in the installation of the communication line and the repair of the communication line;
determining, in accordance with business objectives of the service provider, whether to offer the target service bundle to the prospective subscriber; and
initiating, responsive to determining that the target service bundle is to be offered to the prospective subscriber, the installation of the communication line and the repair of the communication line.

8. The non-transitory machine-readable medium of claim 7, wherein the plurality of service component definitions include business rules for internet protocol traffic priority.

9. The non-transitory machine-readable medium of claim 7, wherein network configurations for each service bundle of the plurality of service bundles include a quality of service policy, a security policy, a queuing policy, or a portal redirect policy.

10. The non-transitory machine-readable medium of claim 7, wherein the operations further comprise selecting the reduced set of service bundles from the plurality of service bundles according to a prospective subscriber's preference.

11. The non-transitory machine-readable medium of claim 7, wherein the operations further comprise selecting the reduced set of service bundles from the plurality of service bundles according to demographic or psychographic information associated with the prospective subscriber.

12. The non-transitory machine-readable medium of claim 7, wherein the operations further comprise selecting the reduced set of service bundles from the plurality of service bundles according to a promotional model, a discount model, or a pricing model.

13. The non-transitory machine-readable medium of claim 7, wherein the operations further comprise:
receiving an activation request associated with a selected service bundle;
retrieving a network configuration associated with the selected service bundle; and
configuring the communication system according to the network configuration.

14. A non-transitory machine-readable medium encoded with software instructions which when executed by a processor, cause the processor to perform operations comprising:
generating a plurality of service bundles, wherein each service bundle of the plurality of service bundles comprises a respective different grouping of a plurality of service component definitions, and wherein the plurality of service bundles comprises all possible permutations derivable from the plurality of service component definitions associated with a plurality of services of a service provider operating a communication system, the service components consisting of communication services provided directly to consumers of the communication services, the consumers being subscribers to the communication system, the permutations subject to network operating constraints of the communication system but not subject to subscriber criteria;
presenting to a prospective subscriber a reduced set of service bundles selected from the plurality of service bundles, wherein the plurality of service bundles are reduced in number according to a data rate determined for a communication loop associated with the prospective subscriber; and
adjusting a cost for a target service bundle of the reduced set of service bundles to generate an adjusted cost, in response to determining that the target service bundle requires an infrastructure modification in the communication system, not previously made by the service provider;

determining, in accordance with business objectives of the service provider, whether to offer the target service bundle to the prospective subscriber;

initiating, responsive to determining that the target service bundle is to be offered to the prospective subscriber, a repair of the communication loop or an installation of another communication loop, in accordance with the infrastructure modification identified as required by the target service bundle, wherein the adjusted cost is higher than a normal subscription price, to recover an investment in the installation or the repair.

15. The non-transitory machine-readable medium of claim 14, wherein the plurality of service component definitions include business rules for internet priority traffic priority.

16. The non-transitory machine-readable medium of claim 14, wherein network configurations are determined and stored for each of the plurality of service bundles, wherein the network configurations include a quality of service policy, a security policy, a queuing policy, or a portal redirect policy.

17. The non-transitory machine-readable medium of claim 14, wherein the infrastructure modification includes an installation of an xDSL line or a repair of an xDSL line.

* * * * *